J. R. RICHER AND J. O. HESSLER.
MILLING CUTTER.
APPLICATION FILED APR. 17, 1919.

1,338,158. Patented Apr. 27, 1920.

Witnesses:

Inventors.
Joseph R. Richer and
John O. Hessler

UNITED STATES PATENT OFFICE.

JOSEPH R. RICHER AND JOHN O. HESSLER, OF CHICAGO, ILLINOIS.

MILLING-CUTTER.

1,338,158.  Specification of Letters Patent.  Patented Apr. 27, 1920.

Application filed April 17, 1919. Serial No. 290,858.

*To all whom it may concern:*

Be it known that we, JOSEPH R. RICHER, a citizen of the United States, and JOHN O. HESSLER, a subject of the King of Sweden, having declared my intention of becoming a citizen of the United States, both residing at Chicago, in the county of Cook and State of Illinois, have invented new and useful Improvements in Milling-Cutters, of which the following is a full, clear, and exact description.

Our invention relates to milling cutters, and its object is to reduce the cost of manufacturing said cutter by making its toothed rim of high speed tool steel and the body encircled thereby of wrought iron or steel.

Heretofore it has been customary not only to manufacture the entire cutter of high speed steel (the cost of which per pound is very great), but because of the great cost of grinding out the central opening in order to enable the tool to be mounted upon arbors of varying diameters, a comparatively large number of these cutters with different peripheral diameters and with central openings of different diameters had to be kept in stock. In addition to these conditions the necessity for economizing the high speed steel made is incumbent for the manufacturer to make the body as thin as possible and to shorten the central boss of the tool, and therefore provide the key that locked the tool to the arbor with less purchase on the cutter, and thus weaken its connection to said shaft. Besides these objections when grinding the side teeth of the cutter, it was necessary for a small milling tool to be used in order to avoid cutting and niching the end edges of the boss.

The object of our invention is to greatly reduce the cost of manufacture thereof, by grinding the side teeth of the rim, before the latter is mounted on the body, with tools of comparatively large diameter, and thus do the work more satisfactorily at a great saving of time and labor, making the boss longer and thus enabling the key or spline to have a better connection with the shaft upon which the cutter is mounted; making it possible to use intaglio or embossed lettering on the body to impress thereon the name of the manufacturer, etc., and also making it possible to bore out the central hole of the body to enable the cutter to be mounted upon a shaft of greater diameter than it was originally intended for. These advantages we accomplish by the means hereinafter fully described, and as particularly pointed out in the claim.

Figure 1:
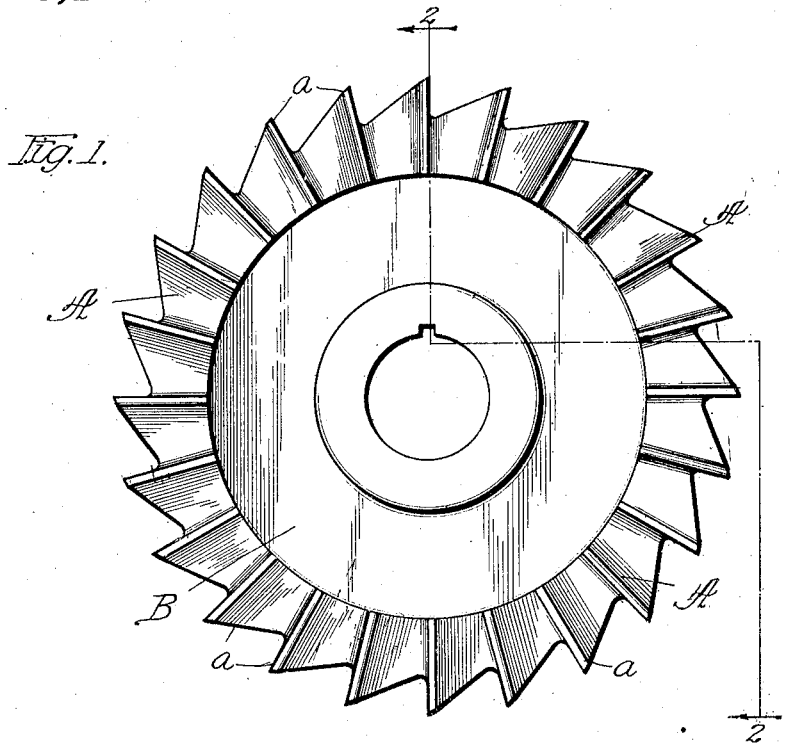
Figure 1 is a side view of our improved milling cutter.
Figure 2:
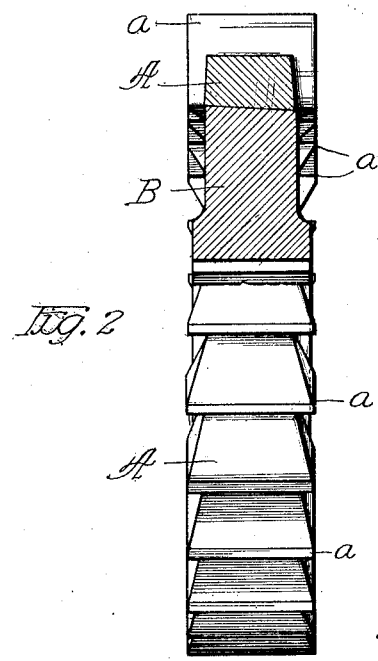
Fig. 2 is a vertical central section therethrough on line 2, 2, of Fig. 1.

Referring to the drawings, A represents the rim of a side-milling cutter which is made of a hard high speed steel with teeth *a* cut therein as desired; and B a circular body therefor which is made of a softer ferrous metal, preferably, wrought iron, upon the periphery of which said rim A is mounted.

The inner circumference of rim A is slightly beveled and the outer circumference of body B is of the same, or a slightly greater diameter, say, two or three one thousandths of an inch, and is correspondingly beveled. When the body and rim are united, the edge of the beveled circumference of the body is inserted in the side of the rim where the edge of its beveled inner circumference is the greatest, and then the body is pressed into the rim by hydraulic pressure or other means, until they are in their proper relative positions in which the expansion of the rim or the compression of the body or both will make such a tight fit that the two parts are practically made inseparable or until a similar pressure applied to the body in the opposite direction, while the rim is held stationary is employed to separate them. When thus separated, a new body with a larger central opening can be substituted for the one removed in the manner, hereinbefore explained.

What we claim as new is:

A milling cutter comprising a rim made of hard high grade steel, the inner circumference of which is slightly beveled, and a metallic body the outer circumference of which is correspondingly beveled and is slightly greater in diameter, and which is adapted to be pressed laterally into and immovably clamped within said rim by the relative expansion and contraction of the body and rim.

In witness whereof we have hereunto set our hands this 22d day of March, 1919.

JOSEPH R. RICHER.
JOHN O. HESSLER.

Witnesses:
FRANK D. THOMASON,
FLORENCE MITCHELL.